United States Patent [19]

Orlowski et al.

[11] 4,439,101
[45] Mar. 27, 1984

[54] APPARATUS FOR SEPARATING NESTED CUP-SHAPED CONTAINERS

[75] Inventors: Gerald J. Orlowski, Scottsdale, Ariz.; Robert S. Adamson, Englewood, Colo.

[73] Assignee: Armour Food Company, Phoenix, Ariz.

[21] Appl. No.: 401,802

[22] Filed: Jul. 26, 1982

[51] Int. Cl.³ .............................................. B65G 59/06
[52] U.S. Cl. ........................................ 414/126; 221/11
[58] Field of Search ................ 221/9, 10, 11, 224, 221/225; 414/112, 116, 125, 126, 128

[56] References Cited

U.S. PATENT DOCUMENTS

| | | | |
|---|---|---|---|
| 1,881,894 | 10/1932 | Olsen | 221/11 |
| 1,927,151 | 9/1933 | Blasco | 414/116 X |
| 2,385,267 | 9/1945 | Franz | 312/44 |
| 2,735,578 | 2/1956 | Woodruff | 221/11 |
| 2,942,758 | 6/1960 | Hogstrom | 221/222 |
| 3,034,683 | 5/1962 | Wilson | 221/1 |
| 3,120,324 | 2/1964 | Amberg | 221/4 |
| 3,283,955 | 11/1966 | Crabtree | 221/251 |
| 3,311,260 | 3/1967 | Kinney | 221/11 |
| 3,347,413 | 10/1967 | Kopera | 221/11 |
| 3,379,346 | 4/1968 | Frederick | 221/224 |
| 3,415,416 | 12/1968 | Broersma | 221/221 |
| 3,472,403 | 10/1969 | Mueller et al. | 221/11 X |
| 3,506,156 | 4/1970 | Hanson | 221/11 |
| 3,520,444 | 7/1970 | Manzer | 221/11 |
| 3,542,243 | 11/1970 | Stockdale | 221/221 |
| 3,576,275 | 4/1971 | Bookout | 221/11 |
| 3,591,041 | 7/1971 | DiGrande | 221/11 |
| 3,651,968 | 3/1972 | Cleland | 221/11 X |
| 3,664,521 | 5/1972 | Feher | 214/8.5 K |
| 3,701,440 | 10/1972 | Windstrup et al. | 414/125 |
| 3,712,506 | 1/1973 | Brownbill | 221/11 |
| 3,771,691 | 11/1973 | Rockola | 221/11 |
| 3,807,600 | 4/1974 | Moss | 221/11 |
| 3,819,086 | 6/1974 | Paolucci | 221/11 |
| 3,843,019 | 10/1974 | Medendorp | 221/225 |
| 4,054,212 | 10/1977 | Mueller | 214/8.5 A |

Primary Examiner—Robert J. Spar
Assistant Examiner—Ken Muncy
Attorney, Agent, or Firm—Frank T. Barber; Richard G. Harrer

[57] ABSTRACT

Apparatus for automatically separating stacks of nested, cup-shaped containers having outwardly projecting lips around their rims so that individual containers are continuously supplied to a point of use. The apparatus includes a separating mechanism for continuously separating the containers in a stack and a feed mechanism for receiving a plurality of stacks of the containers and supplying the same to the separating mechanism as a stack being separated nears depletion.

The separating mechanism includes a plurality of vertically extending circumferentially spaced bars forming a channel for retaining a stack being separated. Pairs of oppositely arranged, substantially horizontally extending holding and stripping fingers engage, hold and separate the lowermost container of the stack, and a pair of oppositely arranged holding shoes support the stack when the holding and stripping fingers are disengaged from the stack during each separating cycle.

The feed mechanism includes an elongated in-feed conveyor which defines a path for receiving a plurality of stacks of the nested containers and which includes a plurality of endless belts for periodically advancing the stacks along the path and towards a staging station on a horizontal support surface of the feed mechanism. A shuttle housing periodically shifts a stack of containers on the staging station laterally over the support surface and over an opening in the surface so that the stack drops into the upper end of the channel of the separating mechanism prior to depletion of the stack being separated.

5 Claims, 15 Drawing Figures

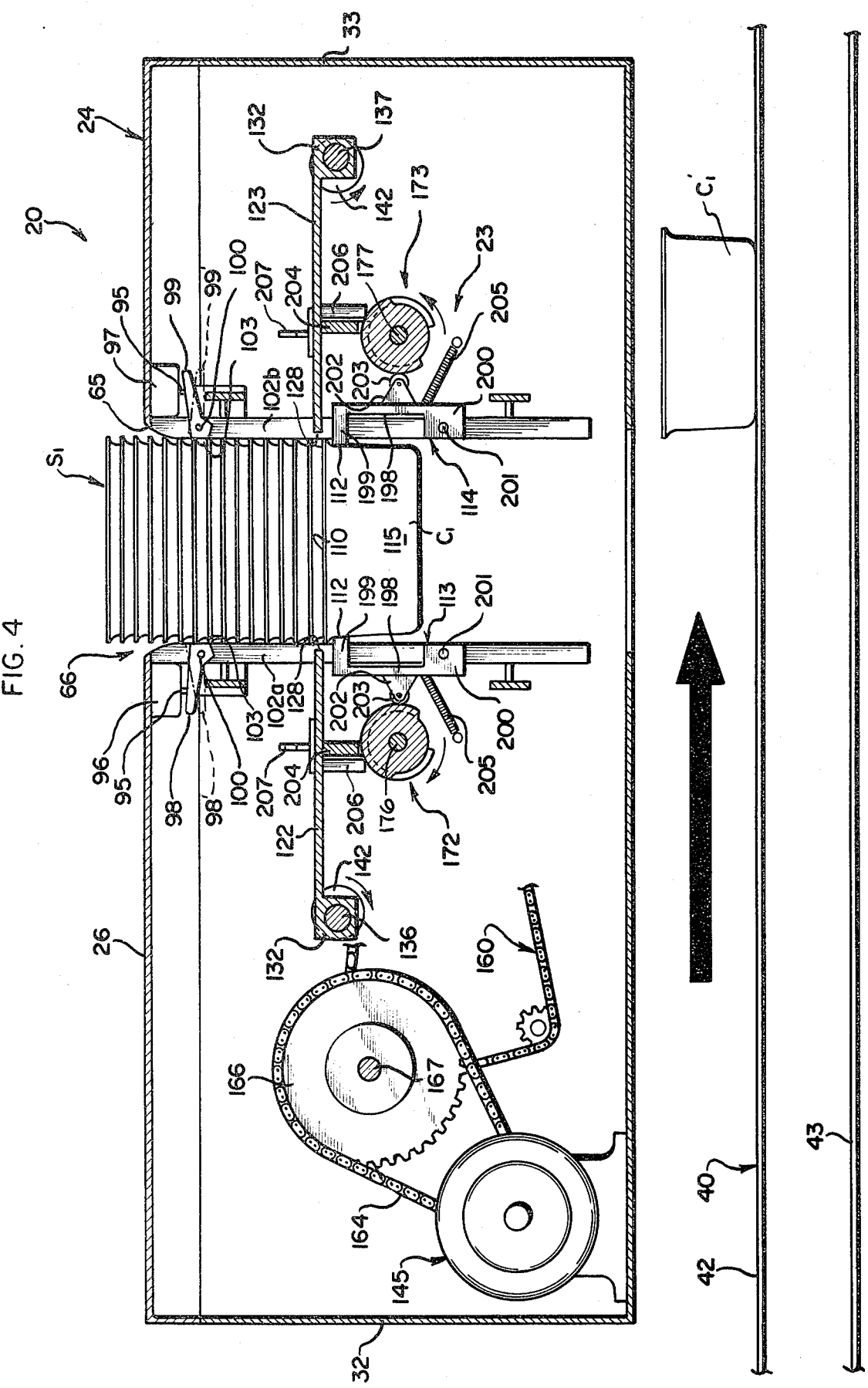

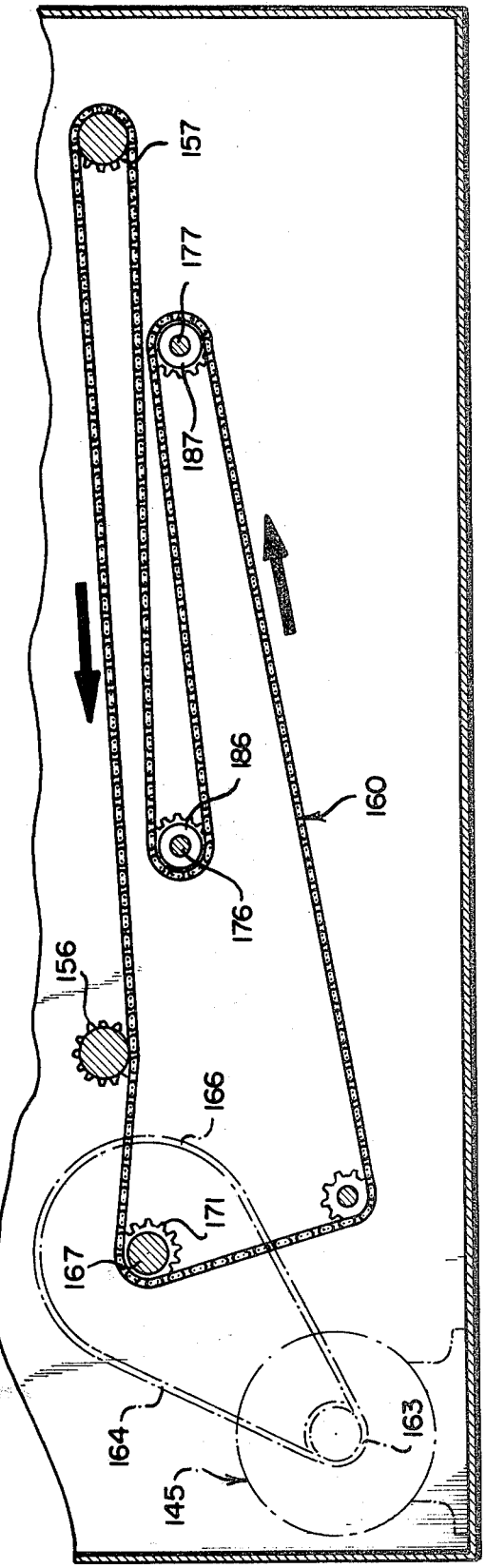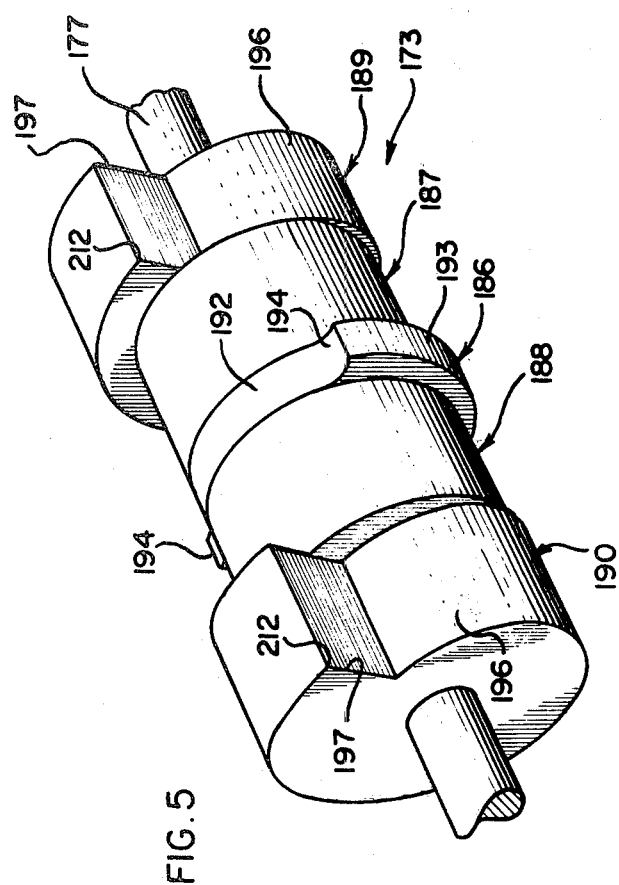

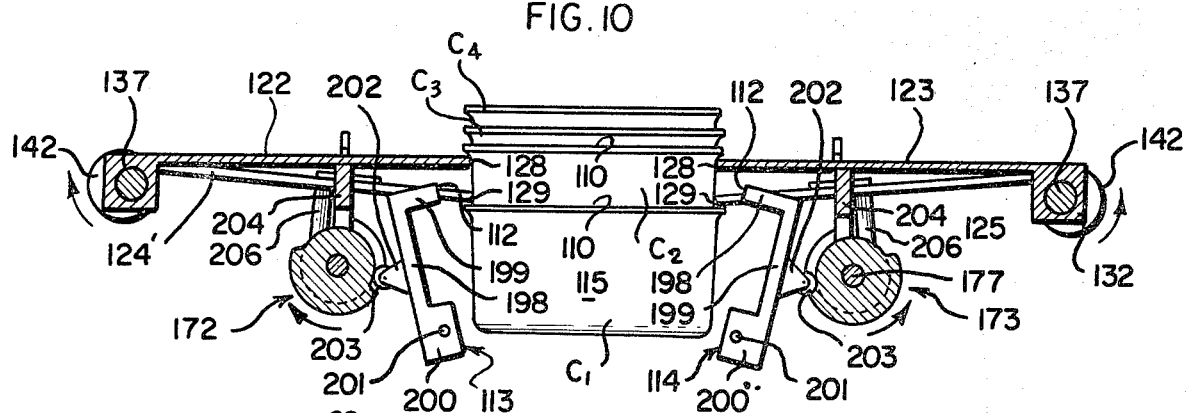
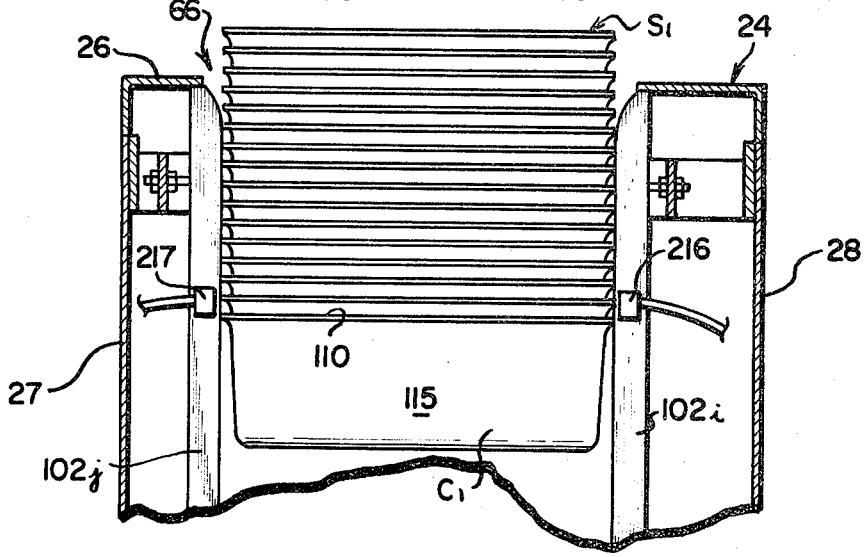
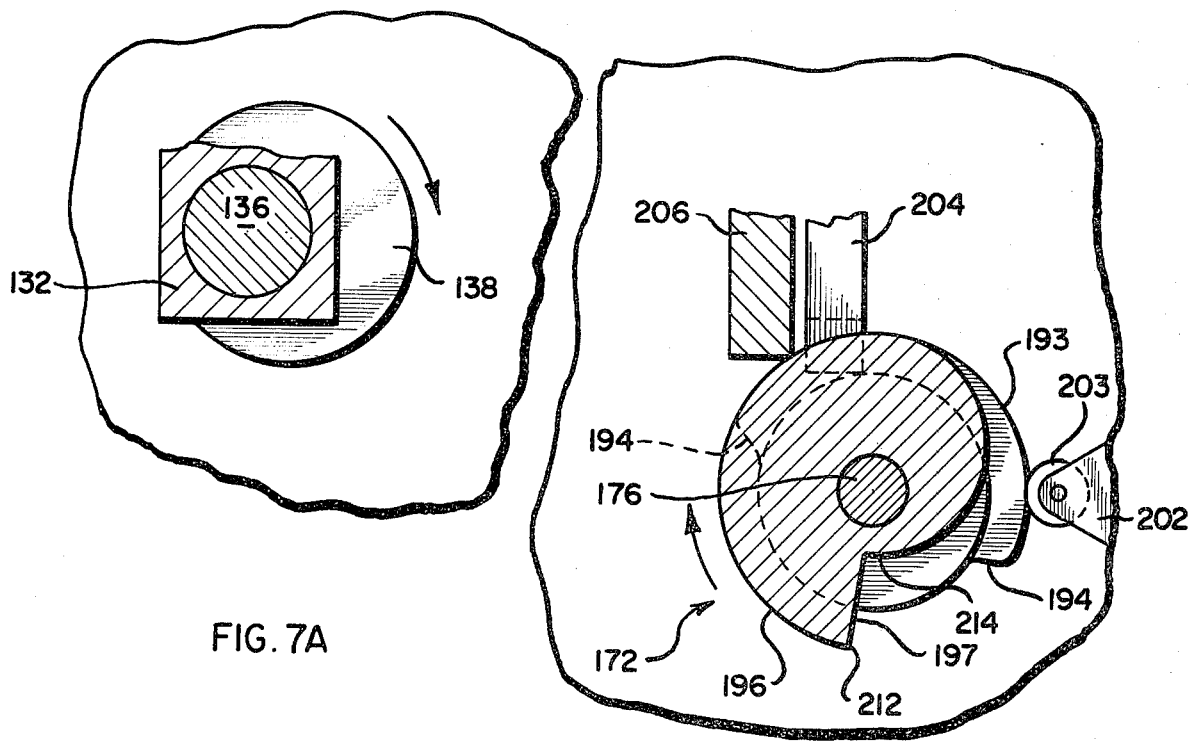

APPARATUS FOR SEPARATING NESTED CUP-SHAPED CONTAINERS

BACKGROUND OF THE INVENTION (1) Field of the Invention

This invention relates to an apparatus for separating nested articles, and more particularly relates to an apparatus for continuously separating one or more stacks of nested, cup-shaped containers.

(2) Description of the Prior Art

Machines or apparatus have been heretofore developed for separating nested, cup-shaped items, such as metal or plastic containers, from a stack thereof to permit the individual containers to be filled with food products, or the like, for subsequent closure and protection by a lid. Examples of apparatus capable of performing the aforementioned separating function are disclosed in Mueller U.S. Pat. No. 4,054,212, Medendorp U.S. Pat. No. 3,843,019, Crabtree U.S. Pat. No. 3,283,955 and Frederick et al U.S. Pat. No. 3,379,346 patents.

In order to maintain continuous operation, many of the de-nesting apparatus heretofore advanced employed feed mechanisms for feeding additional stacks of nested containers into the separating mechanism prior to or upon depletion of a previously supplied stack. Examples of feed mechanisms for intermittently feeding stacks of nested containers to a separating mechanism are disclosed in DiGrande U.S. Pat. No. 3,591,041, Rockola U.S. Pat. No. 3,771,691, Olsen U.S. Pat. No. 1,881,894 and Kopera U.S. Pat. No. 3,347,413 patents.

While the aforementioned prior art container separating and feed mechanisms were capable of performing their intended functions, they were not entirely satisfactory for various reasons, such as complexity of construction and lack of reliability in operation. These and other considerations, rendered the aforementioned prior art devices unsuitable for use in applications where it is necessary to continually supply individual containers to a point of use, such as a food product dispensing machine, over long periods of time and without human supervision.

SUMMARY OF THE INVENTION

The present invention contemplates an improved apparatus for receiving a plurality of stacks of nested containers and sequentially separating the containers in each stack so that individual containers are continuously supplied to a point of use, such as a food product dispensing machine. Specifically, the apparatus of the present invention includes a separating mechanism for rapidly and reliably separating a stack of nested, cup-shaped containers, each of which has a lip around the rim at the upper end thereof, and a feed mechanism for receiving a plurality of stacks of the nested containers and automatically supplying additional stacks to the separating mechanism prior to depletion of the stack being separated.

The separating mechanism, to be hereinafter described in detail, includes guide means for receiving and retaining a stack of the nested containers in vertically extending relation. The separating mechanism also includes finger means positioned intermediate the length of the guide means and movable into engagement with the lip of the lowermost container of the stack in the guide means to separate the container from the stack. The finger means thus includes at least one pair of oppositely arranged, substantially horizontally extending holding fingers disposed on laterally opposite sides of the stack in the guide means, and at least one pair of oppositely arranged, substantially horizontally extending stripping fingers, also disposed on laterally opposite sides of the stack in the guide means, and transversely spaced from the holding fingers. The inner ends of the stripping fingers engage the lip of the lowermost container of the stack and serve to shift the container downwardly and off of the stack.

A pair of pivotally mounted holding shoes are likewise disposed on laterally opposite sides of the lowermost container of the stack in the guide means and are positioned below the holding fingers. The holding shoes are movable between positions engaging the lip of the lowermost container of the stack so as to support the same when the holding and stripping fingers are disengaged therefrom, and positions spaced from the stack.

The separating mechanism further includes actuating means for effecting synchronized, cyclic movement of the holding and stripping fingers, as well as the holding shoes, so that the containers in the stack in the guide means are separated at predetermined intervals. Such actuating means includes a pair of rotatably mounted, horizontally extending, cam shafts which are laterally spaced from the guide means and on which the outer ends of the holding and stripping fingers are eccentrically mounted. Followers on the holding and stripping fingers, as well as on the pivotally mounted shoes, engage cams on the cam shafts and effect pivotal movement of the stripping fingers and pivotal movement of the holding shoes between their operative and inoperative positions.

Separation of the lowermost container from the stack in the guide means is assisted by nozzles which direct jets of air toward the lip of the lowermost container in the stack as the latter is shifted downwardly by the stripping fingers.

The apparatus of the present invention also includes a feed mechanism for supplying stacks of nested containers to the separating mechanism before the stack in the guide means of the separating mechanism is depleted. The feed mechanism thus includes means defining a path for receiving a plurality of stacks of nested containers arranged one behind the other and conveyor means for moving the stacks of containers toward the separating mechanism. A staging station is defined at the end of the path of the feed mechanism, adjacent to the separating mechanism, for retaining a stack of containers in readiness for movement into the guide means of the separating mechanism, and means is provided for effecting movement of the stack of containers on the staging station over the upper end of the guide means, prior to depletion of the stack therein, so that the stack drops into the guideway.

In the embodiment of the feed mechanism described herein, the staging station is provided by a horizontal support surface at the discharge end of the path, and a laterally shiftable shuttle housing is mounted on the support surface for shifting the stack of containers on the staging station over an opening in the support surface, which registers with the guide means of the separating mechanism when the stack of containers in the guide means is approaching depletion. Movement of the shuttle housing is effected by an extensible and retractable plunger, and a pair of container sensing switches are mounted in the guide means of the separating mechanism for controlling the operation of the extensible and retractable plunger.

An upstanding retaining wall on the support surface of the feed mechanism, along the downstream edge of the opening therein, assures alignment of the stack that is shifted from the staging station over the upper end of the guide means by the pusher member and another sensing switch is provided on the staging station for actuating the conveyor means of the path to cause the stacks of containers on the path to advance toward the staging station after the pusher member has cycled.

Accordingly, it is a general object of the present invention to provide a novel and improved apparatus for separating stacks of nested, cup-shaped containers, wherein a separating mechanism is provided for continuously and automatically separating a stack of nested, cup-shaped containers and a feed mechanism is provided for receiving a plurality of said stacks of containers and periodically supplying a stack to said separating mechanism prior to or upon depletion of a previously supplied stack.

A more particular object is to provide a novel apparatus for separating stacks of nested, cup-shaped containers having lips around the rims thereof, which includes a separating mechanism having oppositely arranged pairs of holding and stripping fingers for respectively separating a stack of containers and wherein a pair of oppositely arranged holding shoes are provided to engage and limit downward movement of a stack in the separating mechanism when the holding and stripping fingers are spaced from the stack.

A further object is to provide a novel apparatus of the foregoing character, wherein a laterally shiftable shuttle member is employed to shift a stack of containers on a staging station of the feed mechanism over the upper end of a vertically extending guide means of the separating mechanism as a stack of containers being separated is nearing depletion.

Still another object is to provide a novel apparatus of the foregoing character, wherein a plurality of elongated, vertically extending, circumferentially spaced bars are utilized to define a guide means in the separating mechanism for retaining a stack of nested containers to be separated in vertically extending relation.

These and other objects will become apparent from the following detailed description and accompanying sheets of drawings wherein:

BRIEF DESCRIPTION OF THE DRAWINGS

FIG. 4 is a semi-diagrammatic vertical sectional view taken substantially along the line 4—4 of FIG. 3;

FIG. 5 is a fragmentary perspective view of one of the multiple element cams employed in the separating mechanism of the apparatus;

FIG. 6 is a vertical sectional view, taken substantially along the line 6—6 of FIG. 3, with portions of the apparatus shown in phantom lines;

FIGS. 7-10, inclusive, are a series of semi-diagrammatic vertical sectional views, similar to FIG. 4, showing the portions of the parts of the separating mechanism during one complete operating cycle thereof;

FIGS. 7a-10a, inclusive, are a series of enlarged, fragmentary sectional views showing additional details of the eccentric mounting of the outer ends of the holding and stripping fingers of the separating mechanism illustrated in FIGS. 7-10, inclusive, and also showing the manner in which the multi-element cam coacts with the followers of the fingers to effect the separating action of the mechanism through a cycle of operation; and FIG. 11 is a fragmentary transverse sectional view taken substantially along the line 11—11 of FIG. 3.

GENERAL DESCRIPTION

Figure 1:
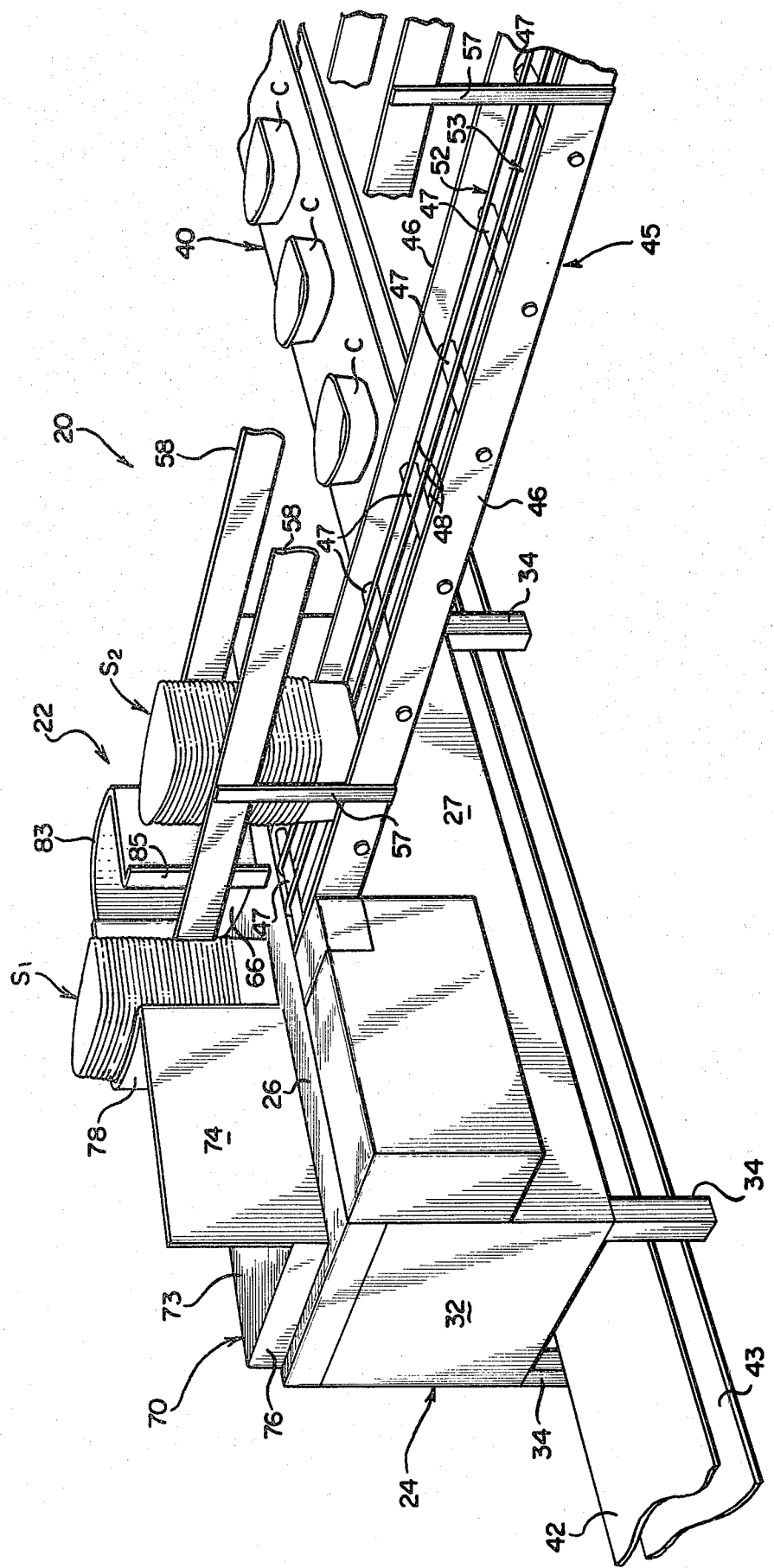
FIG. 1 is a perspective view of an apparatus embodying the features of the present invention, which utilizes a separating mechanism to continuously separate cup-shaped containers from a stack thereof, and a feed mechanism to receive a plurality of stacks of the containers and periodically supply the same to the separating mechanism.
Figure 2:
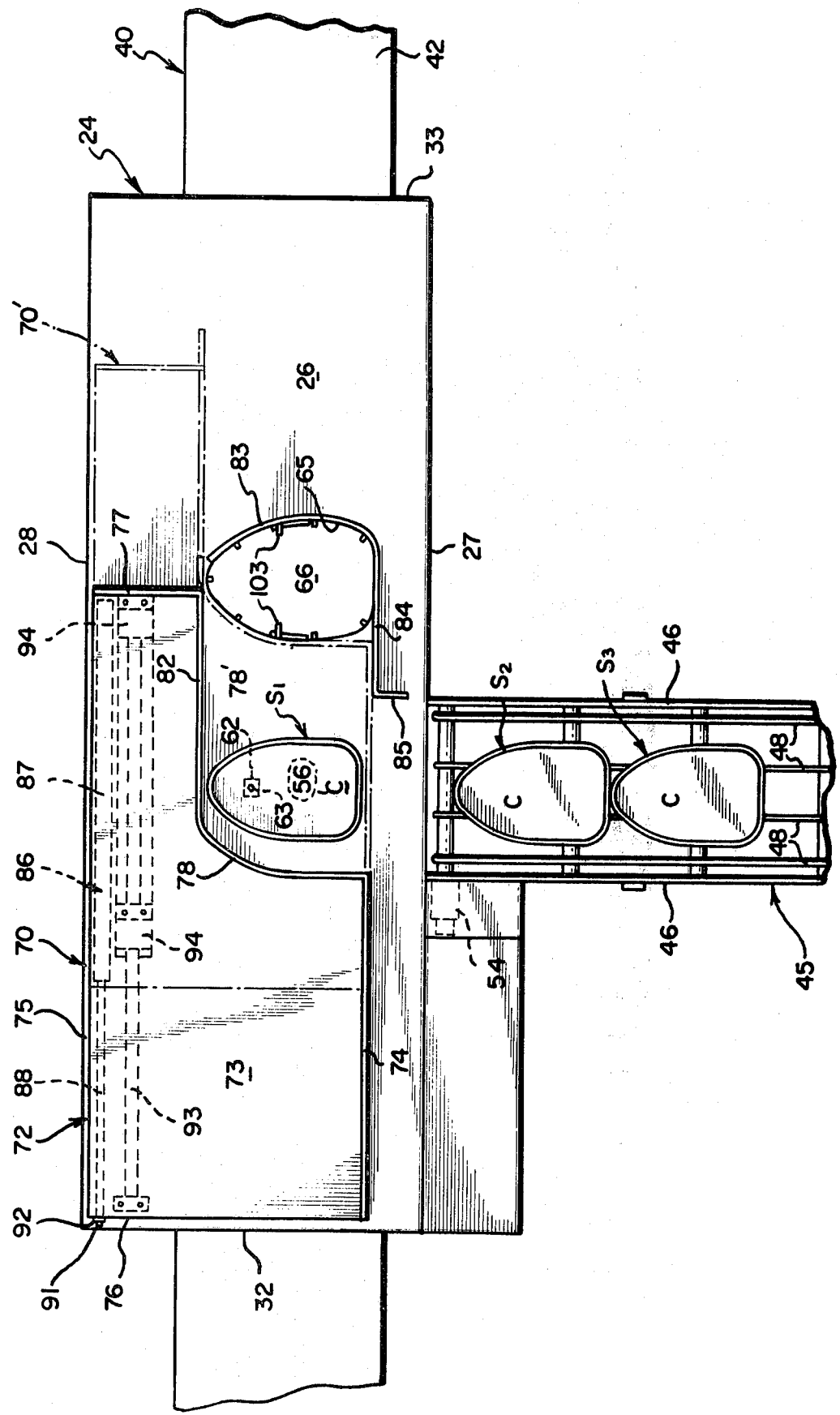
FIG. 2 is a top plan view of a portion of the apparatus illustrated in FIG. 1.

Referring initially to FIG. 1, an apparatus for separating nested, cup-shaped containers from stacks thereof and embodying the features of the present invention, is illustrated and indicated generally at 20. The apparatus 20 thus comprises a feed mechanism, indicated generally at 22 in FIGS. 1 and 2, and a separating mechanism, indicated generally at 23 in FIGS. 3 and 4. As best seen in FIGS. 1 and 2, the separating mechanism 23 and portions of the feed mechanism 22 are enclosed in a rectangular housing 24 having a flat, upper support surface 26, vertically extending front and rear walls 27 and 28, respectively, and left and right side walls 32 and 33, respectively, as viewed in FIG. 2. The housing 24 may also include legs 34 at the corners thereof for supporting the same in an elevated position over a floor or other horizontal surface.

A take-away conveyor, indicated generally at 40 in FIGS. 1 and 2, and having a continuous belt formed with horizontally extending, vertically spaced runs 42 and 43, may be provided to receive containers separated by the apparatus 20 and transport the same to a point of use remote from the apparatus 20. One such point of use may be a meat food product filling machine (not shown). As illustrated in FIGS. 1 and 2, the upper run 42 of the conveyor 40 is shown transporting three cup-shaped containers or cans C so that the containers open upwardly.

The details of the construction and operation of the apparatus 20 will now be described.

The Feed Mechanism 22

As best seen in FIGS. 1 and 2, the feed mechanism 22 comprises means in a form of an in-feed conveyor 45 defining a path for receiving, retaining and transporting a plurality of stacks of containers to be separated. The in-feed conveyor 45 thus includes a laterally spaced pair of elongated plates 46 having a plurality of longitudinally spaced rollers 47 rotatably mounted therebetween. A plurality of endless belts 48 extend lengthwise between the plates 46 and have upper and lower runs 52 and 53, respectively. Drive means in the form of a motor 54 (FIG. 2) effects movement of the upper runs 52 of the conveyor belts 48 in a direction to advance one or more stacks of the containers resting on the upper runs 52 toward a staging station, indicated at 56, when the motor is operating. A plurality of upstanding posts 57 may be secured at spaced intervals to the outer sides of the plates 46 and a pair of longitudinally extending rails 58 may be secured to the upper ends of the posts 57 to prevent stacks of the cans C resting on the belts 48 from falling off of the conveyor while the stacks are being transported toward the staging station 56.

Energization of the drive motor 54 of the in-feed conveyor 45 is controlled by control means in the form of a pneumatic switch 62 (FIG. 2), which is mounted on the underside of the support surface 26 so that the actuating plunger thereof, indicated at 63, projects upwardly through an opening in the surface 26 for engagement by a stack of containers to be separated by the separating mechanism 23. The pneumatic switch 62 is in a fluid circuit (not shown) for controlling the operation of the apparatus 20. The fluid circuit, in the present instance, includes an electric motor driven pump (also not shown) comprising a source of fluid under pressure for the various components of the apparatus 20.

In this regard, compressed air is the preferred fluid for actuating the various components of the apparatus 20. Consequently, the driving, driven and position sensing components of the apparatus 20, to be hereinafter described, are of the pneumatic type. It should be understood, however, that either an electrical or hydraulic type control circuit and components could be used in the apparatus 20, instead of the disclosed pneumatic type.

The circuitry of the pneumatic circuit of the apparatus 20 is such that, when a stack, indicated at $S_1$, of containers is resting on the staging station 56, the plunger 63 of the pneumatic switch 62 is depressed. This results in a shut-off of the supply of air under pressure to the conveyor drive motor 54 and cessation of movement of the belts 48 thereof. Consequently, any stacks of containers on the conveyor 45 will not advance toward the staging station 56. Conversely, if a stack of containers is not resting on the staging station 56, the plunger 63 of the penumatic switch 62 will not be depressed. Consequently, the fluid circuit will supply air under pressure to the conveyor drive motor 54 so that any other stacks of containers on the conveyor 45, such as the stacks $S_2$ and $S_3$ (FIG. 2), will advance toward the staging station 56.

Movement of a stack of containers, such as the stack $S_1$, off of the staging station 56 and into an opening 65 in the support surface 26 is, in the present instance, effected by a laterally shiftable member or shuttle 70. The opening 65 registers with the upper end of a vertically extending guide means or channel 66 comprising part of the separating mechanism 23. The details of the construction and operation of the channel 66 will be described more fully hereinafter.

The shuttle 70 preferably comprises a generally rectangular housing 72 having a flat, upper surface 73, vertically extending front and rear walls 74 and 75, respectively, and vertically extending left and right side walls, 76 and 77, respectively, as viewed in FIG. 2. The front wall 74 of the shuttle 70 is of substantially greater height than the side and rear walls 76 and 75 and includes a portion 78 having substantially the same contours as those of one side of the stack $S_1$ of containers. The front wall 74 also includes a portion 82, of the same height as the contoured portion 78 and which extends parallel to the rear wall 75. The length of the portion 82 is such that when the shuttle housing 72 is shifted laterally across the upper surface 26 of the housing 24 to its phantom line position indicated at 70', the contoured portion 78 will overlie the left margin of the opening 65, as indicated at 78' in FIG. 2. Consequently, the stack of containers that was resting on the staging station 56, such as the stack $S_1$, will be transported by the shuttle 70 over the opening 65 so that the stack will drop through the opening and into the channel 66.

In order to prevent the transported stack of containers $S_1$ from overshooting the opening 65, an upstanding retaining wall 83 of substantially the same height as the contoured portion 78 and having substantially the same contour as the right side of a stack of the containers, is secured to the right margin of the opening 65. The retaining wall 83 also includes a laterally extending straight portion 84, which is spaced slightly forwardly from the front wall 74, so that the wall 74 will pass closely adjacent to and behind the straight wall portion 84 when the shuttle 70 reaches its fully shifted, phantom line position 70'.

A forwardly extending flange 85 may be provided on the left end of the straight portion 84 of the retaining wall 83 to guide movement of the stacks of containers on the conveyor 45 onto the staging station 56 when the conveyor 45 is operating.

As heretofore mentioned, the shuttle 70 is laterally shiftable between its full and broken line positions illustrated in FIG. 2 and indicated at 70 and 70', respectively. To this end, means in the form of an extensible and retractable plunger and cylinder assembly 86 is provided for effecting such movement. The plunger and cylinder assembly 86 thus includes an elongated cylinder 87 having an extensible and retractable plunger 88 mounted therein. The outer end, indicated at 91, of the plunger 88 is secured to the left side wall 76 of the shuttle housing 72 as by a nut 92. A guide bar 93, which is mounted for reciprocating movement in bearing blocks 94, serves to guide movement of the shuttle 70 between its extreme positions.

In order to effect extension and retraction of the plunger 88 and corresponding movement of the shuttle between its full and broken line positions 70 and 70', the associated pneumatic control circuit of the apparatus 20 includes control means in the form of a pair of pneumatic switches 96 and 97 mounted on the underside of the support surface 26 adjacent to the margin of the opening 65 (FIG. 4). The switches 96 and 97 are controlled by extensible and retractable plungers 95, which engage the outer ends of a pair of levers 98 and 99. The levers 98 and 99 are pivotally mounted on pins 100 (FIG. 4) that are secured in a laterally spaced pair 102a and 102b (FIG. 3) of a plurality of elongated, vertically extending, circumferentially spaced guide members or bars. The bars are arranged around the margin of the opening 65 and define the channel 66 of the separating mechanism 23. The other oppositely arranged pairs of bars which define the channel 66 are indicated at 102c,102d; 102e,102f; 102g,102h; and 102i,102j; respectively, in FIG. 3.

The plunger 95 of each of the switches 96 and 97 is urged downwardly by a spring (not shown) and into engagement with the outer end of its associated lever so that when no containers are present in the channel 66, or the uppermost container in the channel is below the ends 103 of the levers 98 and 99, the ends 103 will project into the channel 66 as illustrated in full lines in FIGS. 2 and 3 and in broken lines in FIG. 4. Thus, when the plungers 95 of the switches 96 and 97 are extended, the associated pneumatic control circuit will cause compressed air to be supplied to the left end of the cylinder 87, as viewed in FIG. 2, to cause retraction of the plunger 88 and movement of the shuttle 70 to its broken line position 70' in FIG. 2. Conversely, when a stack of containers is present in the channel 66 and engaged with the inner ends 103 of the levers 98 and 99, the plungers 95 of the switches 96 and 97 will be retracted and the associated pneumatic control circuit will cause fluid under pressure to be supplied to the right end of the cylinder 87, as viewed in FIG. 2, to cause extension of the plunger 88. Consequently, the shuttle 70 will shift to its full line position illustrated in FIG. 2.

Operation of the Feed Mechanism 22

Assuming that a plurality of stacks of containers, such as the stacks $S_1$–$S_3$, are in the positions thereof on the feed mechanism 22 illustrated in FIG. 2 and further assuming that no containers are present in the channel 66 of the separating mechanism 23, the inner ends, indicated at 103, the levers 98 and 99 will be in their broken line positions 98' and 99' illustrated in FIG. 4 so that the inner ends 103 thereof project into the channel 66. Consequently, when the apparatus 20 is turned on, the pneumatic switches 96 and 97 (FIG. 4) will cause the associated pneumatic control circuit of the apparatus 20 to supply compressed air to the left end, as viewed in FIG. 2, of the cylinder 87 of the plunger and cylinder assembly 86. The plunger 88 thereof will thus retract and shift the shuttle 70 to the right until it reaches its phantom line position 70' illustrated in FIG. 2.

As the shuttle 70 shifts from its full to its phantom line position 70', the stack of containers $S_1$ that was previously moved onto the staging station 56 by the conveyor 45 will be engaged by the contoured portion 78 of the shuttle housing 72 and transported across the upper surface 26 of the housing 24 until the contoured wall portion 78 reaches its phantom line position 78' adjacent to the left margin of the opening 65. The stack $S_1$ will then drop through the opening 65 and descend in the channel 66 defined by the circumferentially spaced, vertically extending bars 102a–102j (FIG. 3) until the outwardly projecting lip, indicated at 110, around the rim of the lowermost container, indicated at $C_1$ in FIG. 4, of the stack $S_1$ engages the inner ends, indicated at 112, of a pair of pivotally mounted, oppositely arranged holding or retaining shoes 113 and 114 of the separating mechanism 23. The inner ends 112 of the holding shoes 113 and 114 also engage the side wall, indicated at 115, of the lowermost container of the stack $S_1$ at this time, which engagement serves to support the stack $S_1$ in the channel 66.

The presence of the stack $S_1$ in the channel 66 also causes the inner ends 103 of the levers 98 and 99 to pivot about their mounting pins 100 to their full line positions illustrated in FIG. 4. Such movement causes the plunger 95 of the pneumatic switches 96 and 97 to retract. The associated pneumatic control circuit then causes compressed air to be supplied to the right end of the cylinder 87 so that the plunger 88 extends. The shuttle housing 72 will thus shift to the left, as viewed in FIG. 2, from its phantom line position 70', thereby leaving the staging station 56 unobstructed by the front wall 74 of the shuttle housing 72.

After the shuttle 70 returns to its full line position illustrated in FIG. 2, the pneumatic switch 62 underlying the staging station 56 senses the absence of a stack of containers thereon. Consequently, the switch 62 causes the associated pneumatic control circuit to supply compressed air to the drive motor 54 of the infeed conveyor 45. Stacks of containers on the conveyor 45 will thus advance in unison toward the staging station 56 until the next stack, such as the stack $S_2$, moves onto the staging station 56 and depresses the plunger 63 of the switch 62. The pneumatic circuit will then shut off the supply of air to the drive motor 54 of the in-feed conveyor 45 and the conveyor stops. Thus, a new stack of containers is present on the staging station 56 in readiness to be shifted by the shuttle 70 over the opening 65 and into the channel 66 as soon as the uppermost container of the stack in the channel moves below the inner ends 103 of the levers 98 and 99, as previously described.

In the event that the apparatus 20 is turned off while the shuttle 70 is in a position other than its full line position illustrated in FIG. 2 e.g. its phantom line position 70', the control circuit will prevent air under pressure from being supplied to the conveyor drive motor 54. Consequently, the in-feed conveyor 45 will not advance any stacks of containers thereon toward the staging station 56. However, when the shuttle 70 returns to its full line position illustrated in FIG. 2, the pneumatic switch 62 will cause the control circuit to supply air under pressure to the conveyor drive motor 54 and the stacks of containers on the in-feed conveyor 45 will advance until the next stack moves onto the staging station and depresses the plunger 63 of the switch 62.

Figure 3:
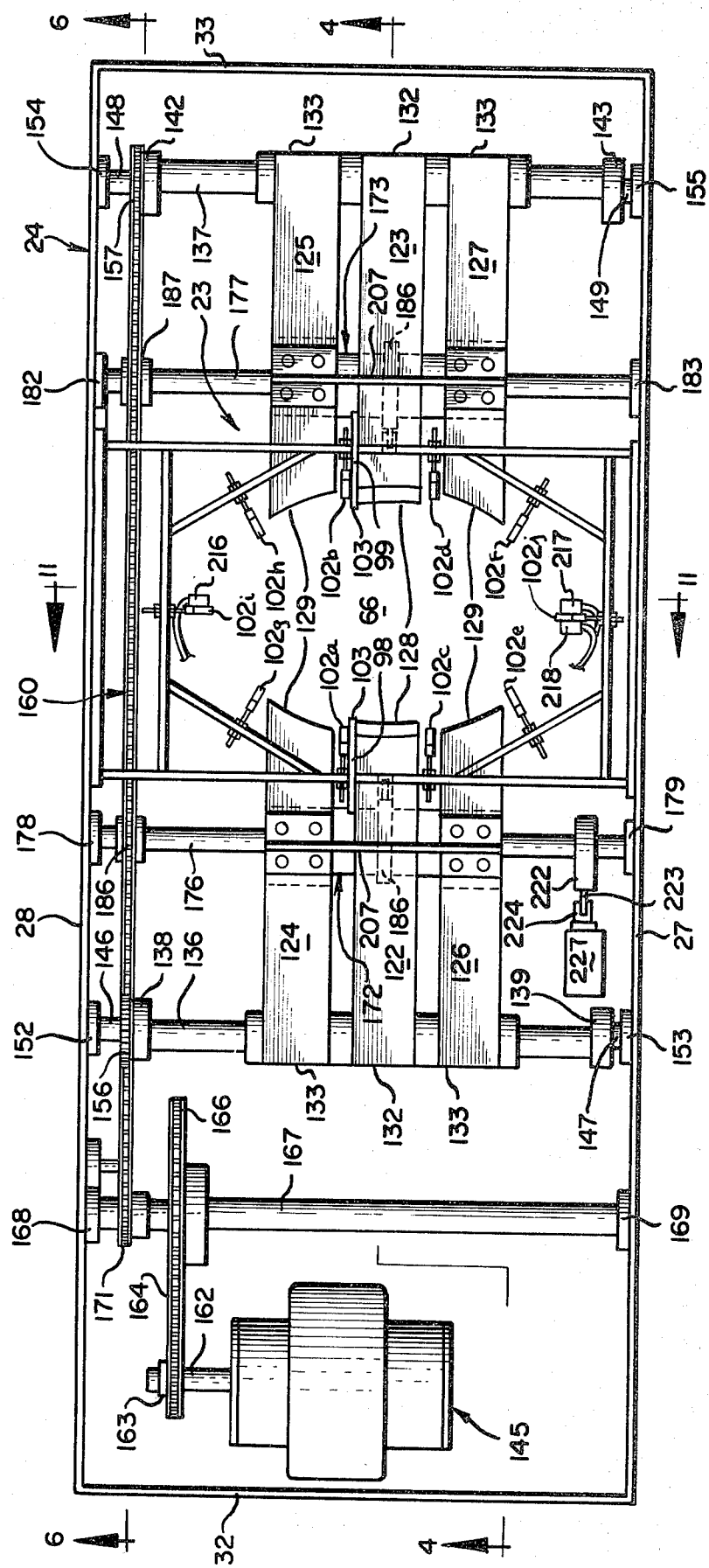
FIG. 3 is a plan view of the separating mechanism of the apparatus illustrated in FIG. 2 but with feed mechanism and support surface thereof removed to show additional details of the separating mechanism.

When the shuttle 70 is in a position other than its full line position illustrated in FIG. 2 e.g. its phantom line position 70', the pneumatic control circuit of the apparatus 20 will also prevent air under pressure from being supplied to the drive motor, indicated at 145, in FIGS. 3 and 4, for the components of the separating mechanism 23. However, when the shuttle 70 returns to its full line position illustrated in FIG. 2, the control circuit will again cause air under pressure to be supplied to the drive motor 145 and effect movement of the components of the separating mechanism 23 until they are positioned for receiving and separating a stack of cans in the channel 66. At this time, the control system will shut-off the supply of compressed air to the main drive motor 145.

The Separating Mechanism 23

Referring now to FIGS. 3 and 4, it will be seen that the separating mechanism 23 comprises the holding shoes 113 and 114, and finger means in the form of a plurality of elongated, substantially horizontally extending, oppositely arranged pairs of fingers, there being at least one oppositely arranged pair of holding fingers 122 and 123 and at least one and preferably two pair of oppositely arranged stripping fingers 124,125 and 126,127, the pairs of stripping fingers 124,125 and 126,127 being disposed on laterally opposite sides of the holding fingers 122 and 123 and being transversely spaced therefrom, as viewed in FIG. 3. The inner ends of the holding fingers 122 and 123 are indicated at 128, and the inner ends of the two pairs of stripping fingers 124,125 and 126,127, are indicated at 129.

While the fingers 122–127 can be of different materials and shapes, they are preferably of metal and in the form of flat bars. In this regard, the laterally outer ends of the holding fingers 122 and 123 are enlarged to provide bearing bosses, indicated at 132, and the laterally outer ends of the pairs of stripping fingers 124,125 and 126,127, are likewise enlarged to provide bearing bosses, indicated at 133. As best seen in FIG. 4, the outer ends of the bosses 132 of the holding fingers 122 and 123 are transversely bored to receive the journals of a pair of shafts 136 and 137 therethrough. The bosses 133 of the pairs of stripping fingers 124,125 and 126,127, are likewise bored to receive the journals of the shafts 136 and 137 therethrough.

As best seen in FIG. 3, the ends of the shafts 136 and 137 include eccentric hubs 138,139 and 142,143, respectively, from which stub shafts 146,147 and 148,149, respectively extend, the stub shafts 146,147 and 148,149 being supported in bearing assemblies 152,153 and 154,155, respectively, secured to the front and rear walls 27 and 28 of the housing 24.

In order to effect eccentric rotation of the shafts 136 and 137 in opposite directions, the hubs 138 and 142 thereof include sprockets 156 and 157, the teeth of which are meshed with an endless chain 160, driven by the pneumatic motor 145. To this end, the motor 145 has an output shaft 162, to which a drive sprocket 163 is secured. A chain 164 meshes with the teeth of the drive sprocket 163 and with a larger, driven sprocket 166 secured to a transversely extending idler shaft 167, which is rotatably supported at its ends in bearing assemblies 168 and 169 carried by the rear and front walls, repectively, of the housing 24. A smaller sprocket 171 is also mounted on the idler shaft 167, the chain 160 being meshed with the sprocket 171 and driven thereby.

As previously mentioned, the shafts 136 and 137 are eccentrically mounted in the hubs 138,139 and 142,143, respectively. Consequently, rotation of the shafts 136 and 137 will effect reciprocating movement of the holding fingers 122 and 123 as well as reciprocating movement of the pairs of stripping fingers 124, 125 and 126,127. In addition to such reciprocating movement, the separating mechanism 23 includes cam means for effecting pivotal movement of the pairs of stripping fingers 124,125 and 126,127 between their substantially horizontal positions illustrated in FIG. 4 and downwardly inclined positions approximately indicated at 124' and 125' in FIG. 10. In order to effect the aforementioned downwardly inclined movement of the inner ends 129 of the pairs of fingers 124,125 and 126,127 during a cycle of operation of the separating mechanism 23, cam means in the form of a pair of cam assemblies 172 and 173 are provided for this purpose.

As will be apparent from FIGS. 3 and 4, the cam assemblies 172 and 173 are respectively mounted on laterally extending shafts 176 and 177, the outer ends of which are supported in bearing assemblies 178,179 and 182,183, respectively, in the rear and front walls 28 and 27 of the housing 24. Sprockets 186 and 187 (FIGS. 3 and 6) on the shafts 176 and 177 are meshed with the chain 160 and serve to rotate the shafts 176 and 177 in opposite directions when the separating mechanism is in operation. Since the cam assembly 172 is of the same construction as the cam assembly 173, only the cam assembly 173 will be described in detail hereinafter.

Referring now to FIG. 5 in conjunction with FIGS. 3 and 4, it will be seen that the cam assembly 173 includes a central cam section 186, a pair of adjacent cylindrical sections 187 and 188, and a pair of outer cam sections 189 and 190. The central cam section 186 of the assembly 173 controls movement of the holding shoe 114. As will be apparent from FIGS. 4 and 5, the central cam section 186 includes a base circle portion 192, a working portion 193 of approximately 180° duration and ramp portions 194 which connect the base circle portion 192 with the working portion 193. The diameters of the cylindrical cam sections 187,188 are substantially equal to the diameter of the base circle portion 192 of the central cam section 186. The outer cam sections 189 and 190 are of the "jump-type". Thus, each of the cam sections 189 and 190 includes a spiral or continuously varying radius working section 196, which is of 360° duration, and a connecting, radial ramp portion 197.

As will be apparent from FIG. 4, each of the holding shoes 113 and 114 is elongated and includes a generally vertically extending or upright section 198 (FIG. 4) having upper and lower end portions 199 and 200, respectively. Each holding shoe is mounted for pivotal movement about a horizontal axis by a pin 201 which extends through the lower end portion 200 of the shoe and so that the holding shoes 113 and 114 are positioned between their respective cam assemblies 172 and 173 and the lowermost container of the stack in the channel 66. The upper end portion 199 of each shoe extends perpendicularly to the upright section 198 and generally horizontally inwardly toward the lowermost container in the stack so that the inner ends 112 of the upper end portions 199 will engage the side wall 115 and underside of the lip 110 of the lowermost container when the holding shoes are pivoted into engagement with this container. The upright section 198 of each of the holding shoes 113 and 114 includes a follower 202 having a roller 203 which rides on the cam section 186. A spring 205 serves to maintain contact between the roller 203 and the cam section 186.

Each of the holding fingers 122 and 123 is likewise provided with a follower 204 on the underside thereof, which is bifurcated so as to ride on the cylindrical cam sections 187 and 188 and so as not to contact the working portion 193 of the central cam section 186. The bifurcated followers 204 may be provided with rollers for engaging the cam sections 187 and 188.

Since the cam sections 187 and 188 are cylindrical, rotation of these cams while engaged by the followers 204 of the fingers 122 and 123 will not result in any vertical movement of these fingers as viewed in FIG. 4, during each revolution of the cam assemblies 172 and 173. However, the ends 128 of the fingers 122 and 123 will experience a slight amount of vertical movement due to the eccentric movement of the bearing bosses 133 at the laterally outer ends of the fingers.

The stripping fingers 124,125 and 126,127 likewise have followers 206 on the undersides thereof for engaging the outer cam sections 189 and 190 of the cam assemblies 172 and 173. In order to assure substantially identical positioning and movement of the inner ends 129 of the fingers 124,126 and 125,127, a connecting member in the form of a crossbar 207 is secured to the upper surface of each laterally spaced pair of the stripping fingers 124,126 and 125,127. The undersides of the crossbars 207 may be recessed to prevent contact with the holding fingers 122 and 123. The followers 204 of the holding fingers 122 and 123 and the followers 206 of the stripping fingers 124,126 and 125,127 are biased into engagement with their respective cam sections 187,188 and 189,190 by springs, not shown.

The manner in which the holding shoes 113,114, holding fingers 122,123 and stripping fingers 124,125 and 126,127 coact to strip containers from a stack in the channel 66 of the apparatus 20 will now be described.

Operation of the Separating Mechanism 23

Figure 7:
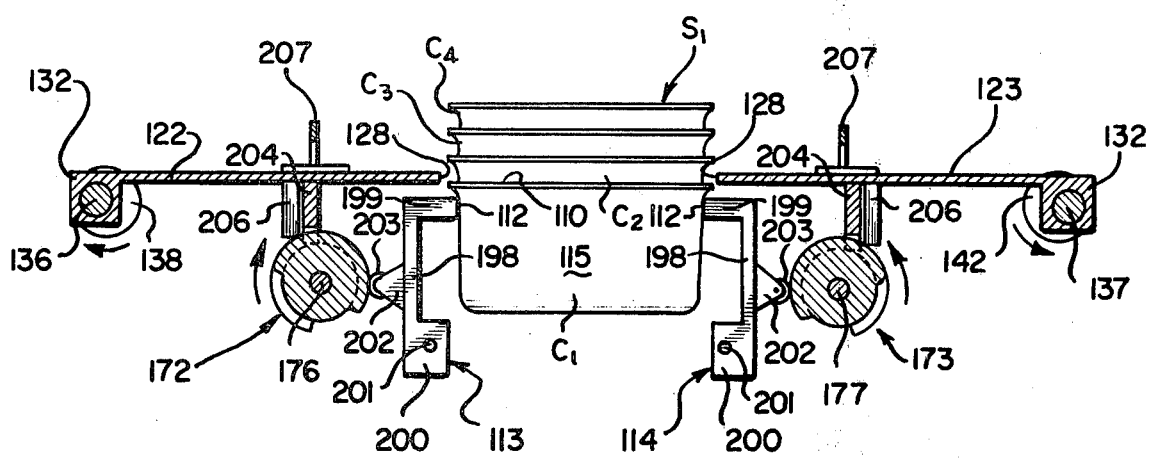

For the purposes of understanding a typical cycle of operation of the separating mechanism 23, it will be assumed that the apparatus 20 is operating and that a stack of containers, such as the stack $S_1$, has been shifted over the opening 65 in the support surface 26 and that the stack has descended into the channel 66 of the separating mechanism 23. It will also be assumed that the parts of the separating mechanism 23 are in the positions illustrated in FIGS. 4 and 7. Thus, the inner ends 128 of the holding fingers 122,123 and the inner ends 129 of the pairs of stripping fingers 124,125 and 126,127 will be retracted from the channel 66. The inner ends 112 of the holding shoes 113 and 114 will, however, be engaged with the outwardly extending, peripheral lip 110 of the lowermost container $C_1$ of the stack $S_1$ so that the stack is retained in the approximate positions thereof shown in FIGS. 4 and 7. For simplification of illustration, only four containers are shown in the stack $S_1$ in FIG. 7.

Figure 8:
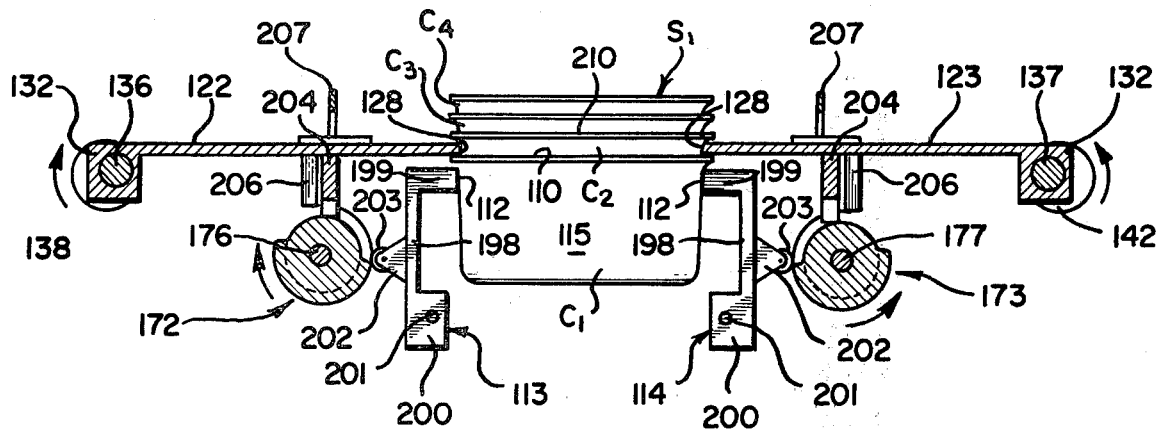

As the chain 160 effects clockwise rotation of the shafts 136 and 176 and counterclockwise rotation of the shafts 137 and 177, the holding fingers 122 and 123 will shift inwardly toward the stack of containers $S_1$ due to the eccentric mounting of the shafts 136 and 137. Such movement continues until the inner ends 128 of the holding fingers 122 and 123 engage the side wall 115 of the container, indicated at $C_2$, above the lowermost container $C_1$ being held by the holding shoes 113 and 114, as is illustrated in FIG. 8. The position of the cam assembly 172 when the holding fingers 122 and 123 are positioned as illustrated in FIG. 8, is shown in greater detail in FIG. 8A.

Figure 8A:
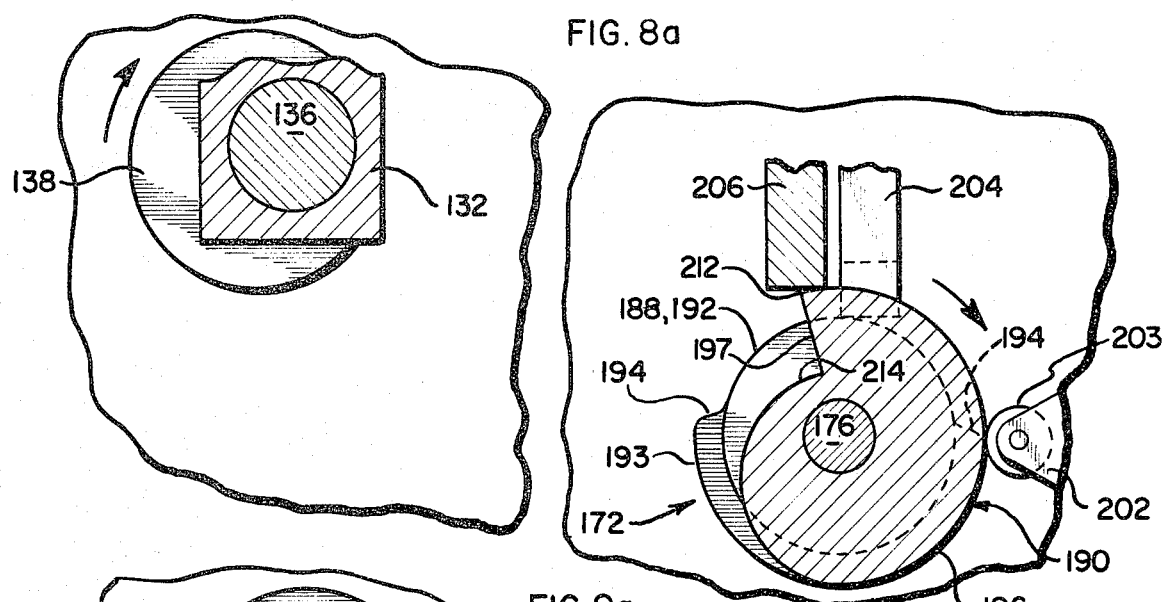

Thus, as shown in FIG. 8A, the roller 203 of the follower 202 of the holding shoe 113 is about to move off of the working portion 193 of the cam section 186 and onto the base circle portion 192 thereof. In addition, the bifurcated follower 204 of the finger 122 is in contact with the cylindrical cam sections 187 and 188, and the followers 206 of the stripping fingers 124 and 126 are approaching the end, indicated at 212, of the working sections 196 of the cams 189 and 190. Consequently, the inner ends 129 of the pairs of stripping fingers 124,125 and 126,127 are substantially coplanar with those of the inner ends 129 of the holding fingers 122 and 123.

Since the inner ends 128 of the holding fingers 122 and 123, and the inner ends 129 of the stripping fingers 124,125 and 126,127 have moved under the lip 110 of the container $C_2$ immediately above the container $C_1$, these fingers are now capable of supporting the container $C_2$ and the remainder of the containers thereabove in the stack $S_1$. Only the containers $C_3$ and $C_4$ of the stack $S_1$ are shown in FIG. 8 in addition to the container $C_2$.

Figure 9:
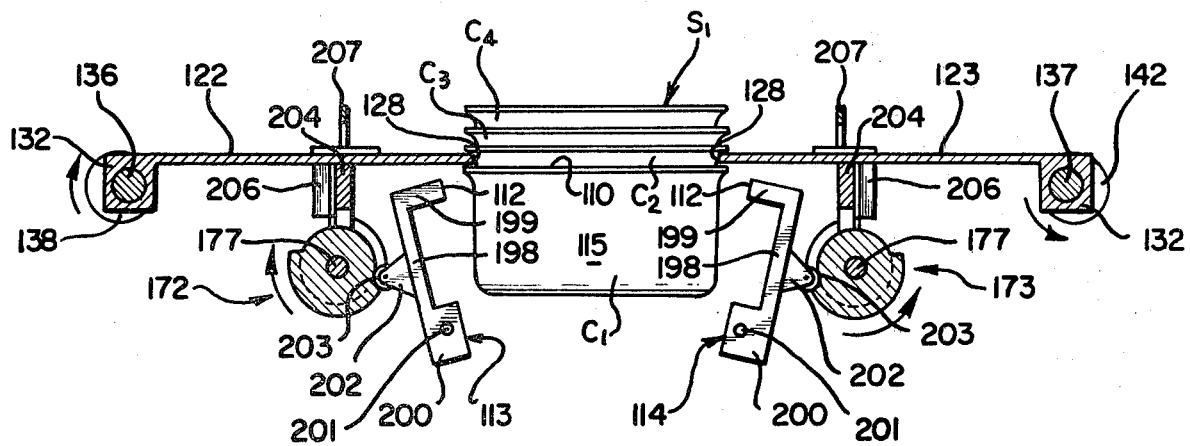
Figure 9A:
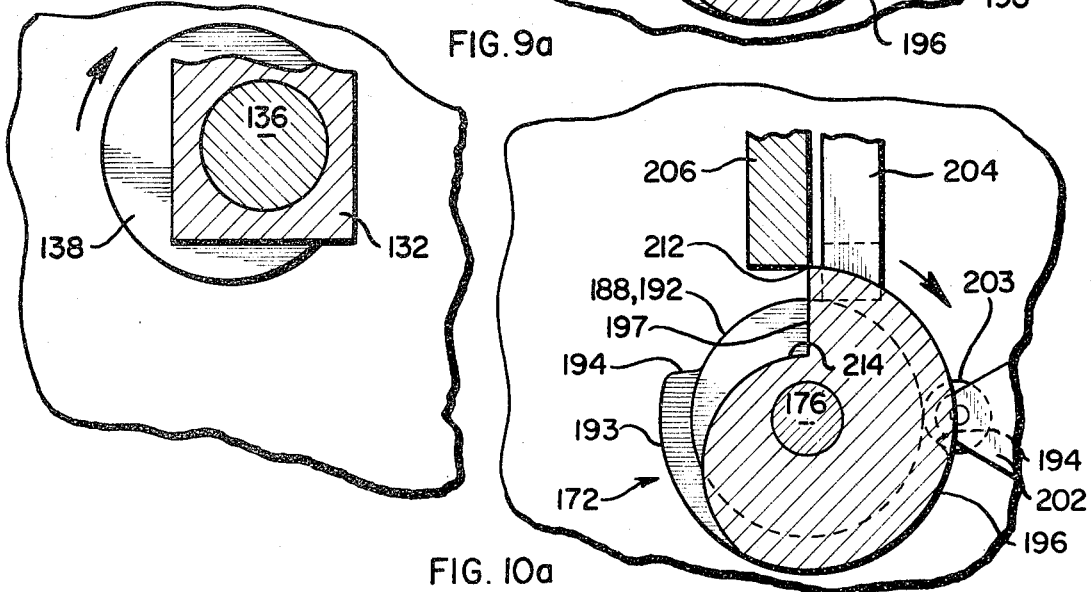

Continued clockwise rotation of the shafts 136 and 176, and counterclockwise rotation of the shafts 137 and 177 from the positions thereof illustrated in FIGS. 8 and 8A to the positions thereof illustrated in FIGS. 9 and 9A results in the rollers 203 of the holding shoe followers 202 moving off of the working portions 193 of the cam sections 186 and onto the base circle portions 192 thereof. Thus, the springs 205 will cause the holding shoes 113 and 114 to pivot about their mounting pins 201 and the inner ends 112 of the upper end portions 199 thereof to move away from the lowermost container $C_1$ so that the latter is unsupported. The followers 206 of the pairs of stripping fingers 124,125 and 126,127 have not, however, moved off of the high points 212 of their cam sections 189 and 190, but are just about to do so.

Figure 10A:
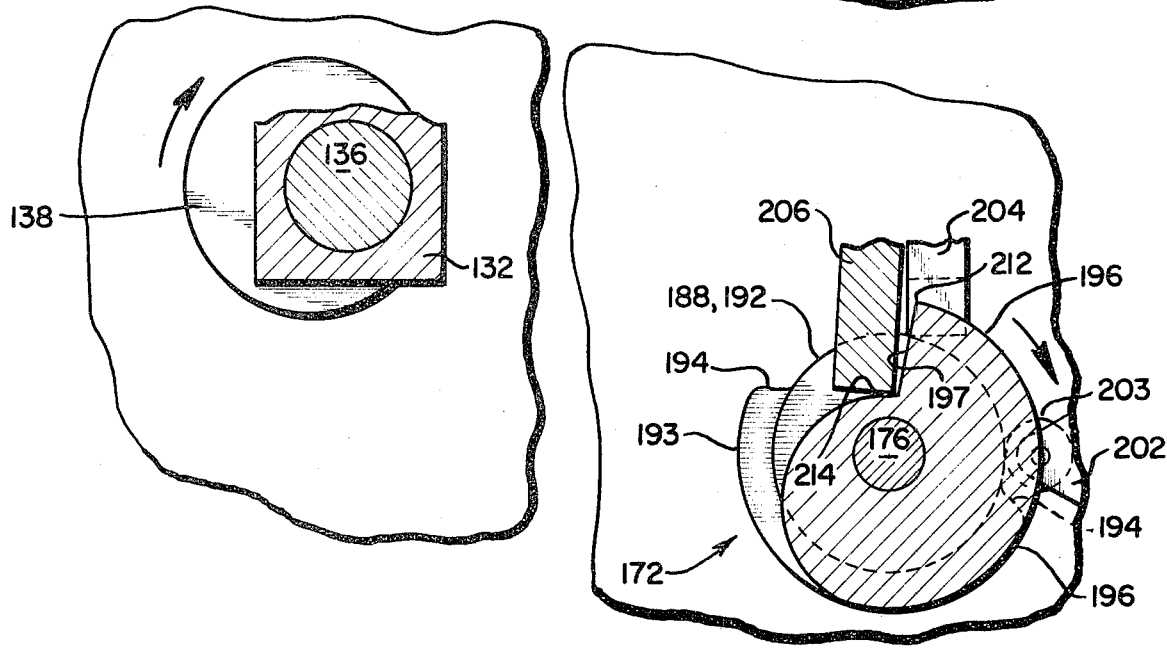

Additional incremental clockwise and counterclockwise movement of the shafts 176 and 177 causes the followers 206 of the stripping fingers 124,125 and 126,127 to move off of the ends 212 of the working portions 196 of the cam sections 189 and 190 and into engagement with minimum radius portions, indicated at 214, of these cam sections, as illustrated in FIGS. 10 and 10A. Such movement of the followers 206 results in downward pivotal movement of the ends 129 of the stripping fingers 124,125 and 126,127 to the positions thereof illustrated at 124' and 125' in FIG. 10. Since the inner ends 129 of the stripping fingers 124,125 and 126,127 overlap the lips 110 of the container $C_1$, this container is caused to shift downwardly with respect to the container $C_2$ and the remaining containers in the stack $S_1$. The extent of downward movement of the ends 129 of the pairs of stripping fingers 124,125 and 126,127 is in the order of about one inch. Such movement is normally sufficient to separate the lowermost container $C_1$ from its frictional engagement with the container $C_2$ thereabove so that the container $C_1$ drops away from the stack and onto the underlying take-away conveyor 40, as illustrated by the container $C_1'$ in FIG. 4.

In order to assist disengagement of the lowermost container $C_1$ from the next container $C_2$ thereabove, means in the form of at least one and preferably a plurality of nozzles are provided in the channel 66 for directing jets of fluid under pressure, specifically, compressed air, between the lips 110 of the lowermost container $C_1$ and the container $C_2$ thereabove during the separating cycle. To this end, the nozzles are preferably arranged at opposite ends of the stack $S_1$ of container, and, as shown in FIG. 3, are secured to the sides of the vertically extending bars 102$i$ and 102$j$. In the present instance, one nozzle 216 is secured to the bar 102$i$ and a pair of the nozzles 217 and 218 are secured to opposite sides of the bar 102$j$.

Operation of the nozzles 216–218 to emit jets of air in the space between the lips 110 of the containers $C_1$ and $C_2$ is controlled by a cam 222, which may be mounted on the shaft 176 for rotation therewith. The cam 222 engages a roller 223 on the outer end 224 of the shiftable plunger 226 of a pneumatic switch 227, the switch 227 being operable when actuated to cause the associated pneumatic control circuit to supply air under pressure to the nozzles 216, 217 and 218.

Continued clockwise rotation of the shafts 136 and 176 and counterclockwise rotation of the shafts 137 and 177 from the positions thereof illustrated in FIGS. 10 and 10A will result in upward movement of the followers 206 and consequently upward pivotal movement of the ends 129 of the stripping fingers 124,125 and 126,127 from the positions thereof indicated at 124' and 125' in FIG. 10 to the positions thereof illustrated in FIG. 9.

After something less than 180° of rotation of the shafts 176 and 177 from the positions thereof illustrated in FIGS. 10 and 10A, the followers 206 will have moved onto the maximum lift portions 196 of the cams 189 and 190 so that the fingers are in substantially the same positions as they were in FIG. 9 i.e. they will be substantially coplanar with those of the holding fingers 122 and 123 and will be engaging the side wall of container $C_3$ above the lip 110 of the container $C_2$, which is now the lowermost container in the stack $S_1$. Thereafter, additional incremental rotation of the shafts 176 and 177 will result in the rollers 203 of the holding shoe followers 202 moving onto the working portions 193 of the cam sections 186, as approximately illustrated in FIGS. 7 and 7A. The ends 112 of the holding shoes 113 and 114 will thus move into engagement with the sides 115 of the container $C_2$, which is now the lowermost container in the stack to complete the separation cycle.

Thus, the lowermost container of the stack in the channel 66 of the separating mechanism 23 will be separated for each revolution of the shafts 136, 176 and 137, 177, at the approximate rate of one container per second.

From the foregoing description, it will now be appreciated that the apparatus 20 is capable of rapidly, reliably and automatically separating containers from a plurality of stacks thereof in which the containers in each stack are either loosely or tightly nested together, and delivering the separated containers to a point of use, such as a food product filling machine. The apparatus 20 makes it unnecessary for an operator of the machine to place his or her hands in the interiors of the containers prior to, during or after separation. Consequently, the possibilities of contaminating the containers prior to filling is that much less. In addition, the construction of the feed and separating mechanisms 22 and 23 of the apparatus 20 substantially reduces the possibility of injury to an operator of the apparatus.

In the foregoing description, the apparatus 20 has been described in connection with stacks of the containers C, which are generally oval in plan. It should be understood, however, that the apparatus 20 could also be used to separate stacks of nested, cup-shaped containers having shapes different from that of the containers C, in plan, such as circular or rectangular.

While one or more embodiments of the invention have been herein illustrated and described, it will be understood that modifications and variations thereof may be developed which do not depart from the spirit of the invention and the scope of the appended claims.

We claim:

1. Apparatus for continuously separating cup-shaped containers from a plurality of stacks thereof in which the containers in each stack are arranged in upwardly opening nested relation, said apparatus comprising, in combination, a separating mechanism for separating the containers of a stack supplied thereto and a feed mechanism for supplying additional stacks of containers to said separating mechanism prior to or upon depletion of a stack being separated, said separating mechanism including vertically extending guide means for supporting a stack of containers to be separated in vertically extending relation, said guide means having an upper end through which a stack of containers to be separated descends, finger means movable into and out of engagement with the containers of the stack in said guide means and operable to separate said containers, one at a time, from the bottom of said stack, and at least one holding shoe disposed below said finger means and operable to engage a side wall of the lowermost container in the stack and thus support the stack of containers in said guide means while said finger means is disengaged from said stack, said feed mechanism including means defining a path for receiving and retaining a plurality of stacks of said containers, one end of said path terminating at a staging station adjacent to the upper end of said guide means, conveyor means for advancing stacks of containers on said path toward and onto said staging station, shiftable means for effecting movement of a stack of containers on said staging station over the upper end of said guide means prior to or upon depletion of a stack being separated, first control means carried by said guide means for controlling said shiftable means, and second control means carried by said staging station and operable to actuate said conveyor means whenever a stack of containers and said shiftable means are absent from said staging station.

2. The combination of claim 1, in which said first control means includes at least one pivotally mounted lever having an end movable between a first position extending into said guide means and a second position retracted from said guide means, said lever being movable to said second position by a stack of containers in said guide means, and said first control means is operable to cause said shiftable means to move a stack of containers on said staging station over the upper end of said guide means whenever said lever is in said first position.

3. The combination of claim 2, in which said first control means comprises a pneumatic switch adapted to be connected to an associated pneumatic control circuit for controlling the operation of said shiftable means, and said pneumatic switch includes a shiftable plunger engaged with and movable by said pivotally mounted lever.

4. The combination of claim 3, in which said first control means includes a pair of said pneumatic switches adapted to be connected to said associated pneumatic control circuit and a pair of said pivotally mounted levers movable between said first and second positions, and said pneumatic switches and levers are disposed on opposite sides of said guide means.

5. The combination of claim 1, in which said second control means comprises a pneumatic sensing switch adapted to be connected to an associated pneumatic control circuit for controlling the operation of said conveyor means, and said pneumatic sensing switch has a plunger adapted to be depressed by a stack of containers resting on said staging station.

* * * * *